US010028254B2

United States Patent
Kota et al.

(10) Patent No.: US 10,028,254 B2
(45) Date of Patent: Jul. 17, 2018

(54) TECHNIQUES FOR IMPROVED DECODING OF SYSTEM INFORMATION BLOCKS

(71) Applicant: QUALCOMM Incorporated, San Diego, CA (US)

(72) Inventors: Sumanth Kumar Kota, Hyderabad (IN); Krishna Rekhani, Hyderabad (IN); Sivasubramanian Ramalingam, Hyderabad (IN); Sathish Krishnamoorthy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 15/377,786

(22) Filed: Dec. 13, 2016

(65) Prior Publication Data
US 2018/0167911 A1 Jun. 14, 2018

(51) Int. Cl.
| H04W 72/02 | (2009.01) |
| H04W 36/04 | (2009.01) |
| H04W 68/00 | (2009.01) |
| H04W 36/16 | (2009.01) |
| H04W 36/24 | (2009.01) |

(52) U.S. Cl.
CPC ........... *H04W 72/02* (2013.01); *H04W 36/04* (2013.01); *H04W 68/005* (2013.01); *H04W 36/16* (2013.01); *H04W 36/24* (2013.01)

(58) Field of Classification Search
None
See application file for complete search history.

(56) References Cited

U.S. PATENT DOCUMENTS

| 8,830,863 | B2 | 9/2014 | Novak et al. | |
| 9,049,708 | B2 | 6/2015 | Freda et al. | |
| 9,204,316 | B2 | 12/2015 | Suzuki et al. | |
| 9,445,337 | B2 * | 9/2016 | Hole | H04W 36/30 |
| 9,538,455 | B2 * | 1/2017 | Shi | H04W 48/10 |

(Continued)

FOREIGN PATENT DOCUMENTS

EP 2400798 A2 12/2011

OTHER PUBLICATIONS

Ericsson: "The Need for Additional Broadcast Capacity", 3GPP DRAFT; R2-133415, 3rd Generation Partnership Project (3GPP), Mobile Competence Centre; 650, Route Des Lucioles; F-06921 Sophia-Anti Polls Cedex; France, vol. RAN WG2, No. Ljubljana, Slovenia; Sep. 28, 2013, XP050719175, Retrieved from the Internet: URL:http://www.3gpp.org/ftp/tsg_ran/WG2_RL2/TSGR2_83bis/Docs/ [retrieved on Sep. 28, 2013], 14 pages.

(Continued)

*Primary Examiner* — Candal Elpenord
(74) *Attorney, Agent, or Firm* — Anthony R. Morris

(57) ABSTRACT

Aspects of the present disclosure generally relate to managing decoding of system information blocks (SIBs) at a user equipment (UE) and managing SIB transmissions at a base station. For example, the described aspects at the UE may include detecting a trigger event for decoding one or more SIBs received from a cell and determining to avoid decoding of at least one SIB received from the cell in response to the detected trigger event and a mobility pattern of the UE. The described aspect at the UE may further include using a stored version of the at least one SIB for communication with the first cell.

21 Claims, 9 Drawing Sheets

(56) References Cited

U.S. PATENT DOCUMENTS

| | | | |
|---|---|---|---|
| 9,894,588 B2* | 2/2018 | Kim | H04W 36/32 |
| 2005/0177623 A1* | 8/2005 | Roberts | H04W 48/12 |
| | | | 709/213 |
| 2007/0260851 A1* | 11/2007 | Taha | H04W 52/0229 |
| | | | 712/204 |
| 2008/0170526 A1* | 7/2008 | Narang | H04W 52/0216 |
| | | | 370/311 |
| 2008/0293419 A1* | 11/2008 | Somasundaram | |
| | | | H04M 15/7657 |
| | | | 455/437 |
| 2010/0022250 A1* | 1/2010 | Petrovic | H04J 11/0093 |
| | | | 455/450 |
| 2012/0170515 A1* | 7/2012 | Patil | H04W 48/12 |
| | | | 370/328 |
| 2013/0295951 A1* | 11/2013 | Mach | H04W 36/32 |
| | | | 455/456.1 |
| 2014/0098761 A1* | 4/2014 | Lee | H04W 74/006 |
| | | | 370/329 |
| 2015/0099517 A1* | 4/2015 | Wang | H04W 52/0258 |
| | | | 455/436 |
| 2015/0351011 A1 | 12/2015 | Shukla et al. | |
| 2016/0142898 A1 | 5/2016 | Poitau et al. | |
| 2016/0198438 A1 | 7/2016 | Wong et al. | |
| 2017/0311217 A1* | 10/2017 | Jung | H04W 36/04 |
| 2017/0374608 A1* | 12/2017 | Li | H04W 48/08 |

OTHER PUBLICATIONS

Ericsson: "System Information Broadcast for NB-IOT", 3GPP DRAFT; R2-154170, 3rd Generation Partnership Project (3GPP), Mobile Competence Centre; 650, Route Des Lucioles; F-06921 Sophia-Anti Polls Cedex; France, vol. RAN WG2, No. Malmo, Sweden; Oct. 4, 2015, XP051004760, Retrieved from the Internet: URL:http://www.3gpp.org/ftp/Meetings_3GPP_SYNC/RAN2/Docs/ [retrieved on Oct. 4, 2015], 5 pages.

Huawei Technologies Co., et al., "Discussion on Timer for the MIB & SIB Reading", 3GPP DRAFT; GP-100373, 3rd Generation Partnership Project (3GPP), Mobile Competence Centre; 650, Route Des Lucioles; F-06921 Sophia-Anti Polls Cedex; France, vol. TSG GERAN, No. Berlin; Mar. 1, 2010, XP050416721, [retrieved on Mar. 1, 2010], 4 pages.

International Search Report and Written Opinion—PCT/US2017/057697—ISA/EPO—dated Jan. 26, 2018.

* cited by examiner

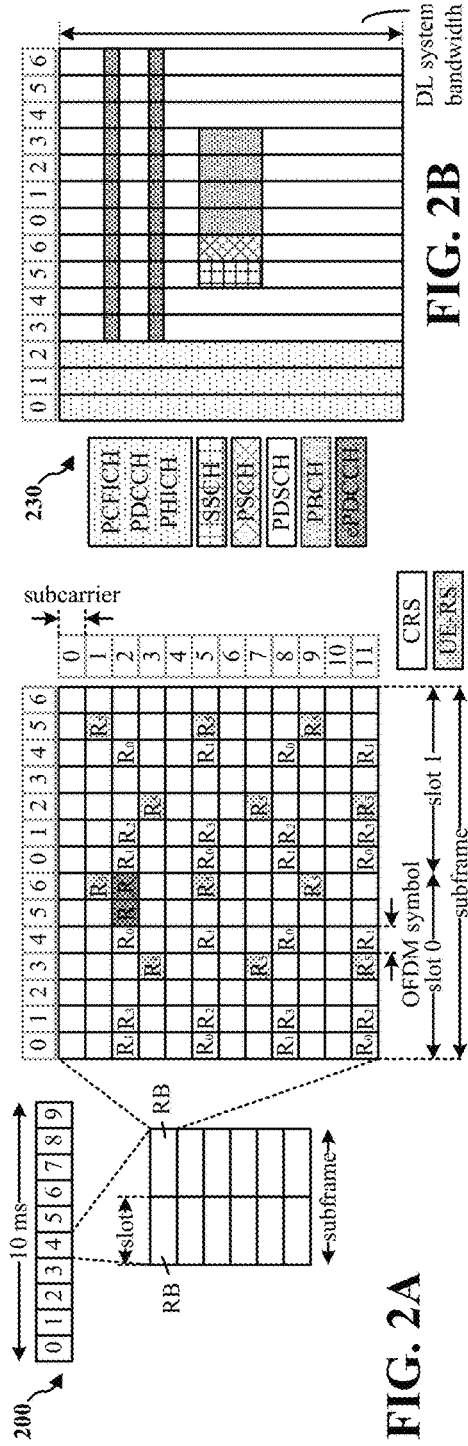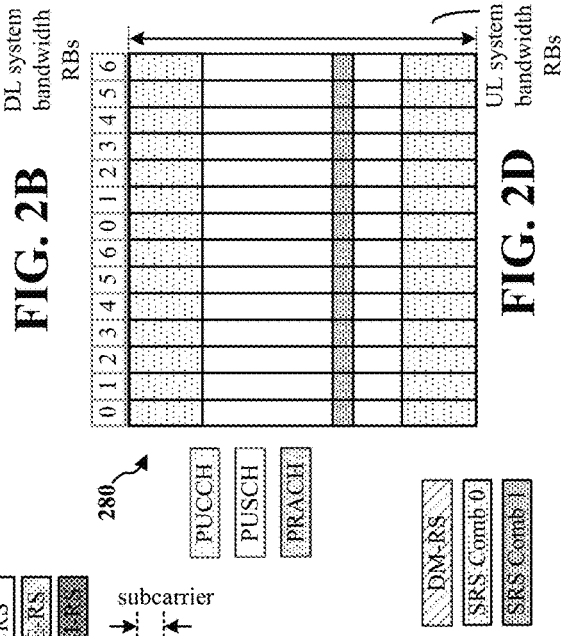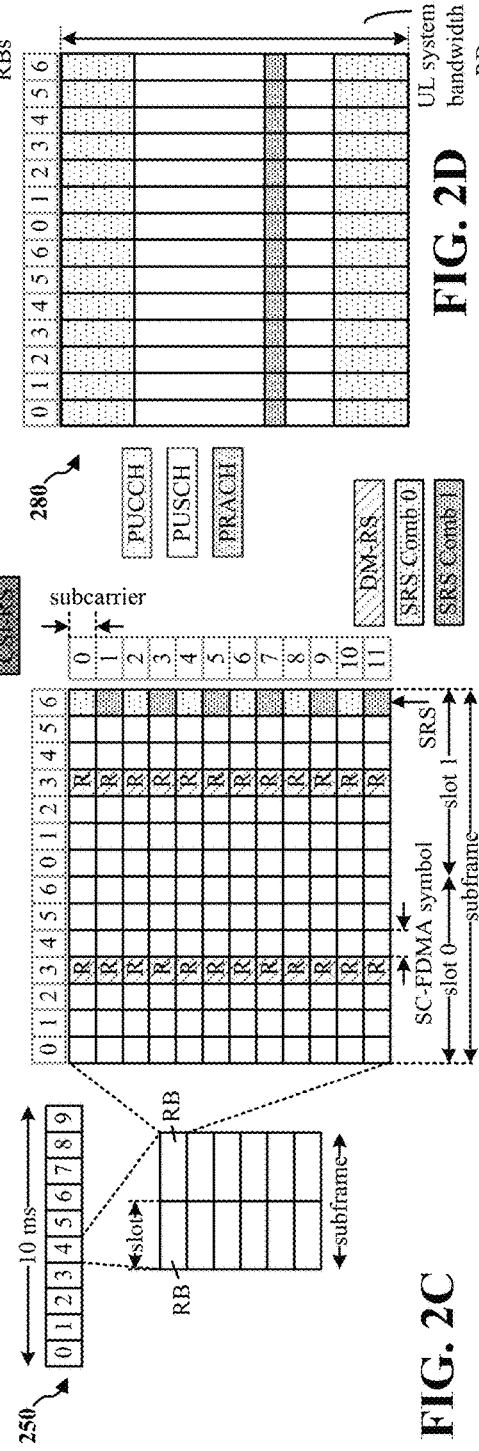

TECHNIQUES FOR IMPROVED DECODING OF SYSTEM INFORMATION BLOCKS

BACKGROUND

The present disclosure relates generally to communication systems, and more particularly, to decoding of system information blocks (SIBs) at a user equipment (UE) in a wireless communications system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In wireless networks (e.g., LTE or UMTS networks), decoding of system information blocks (SIBs) consumes a significant amount of power and time (e.g., processing resources) at a UE. For example, when a UE is mobile, the UE may frequently perform cell reselections and read (e.g., decode) the SIBs broadcasted from the cells. In some cases, even stationary UEs, e.g., utility meters, that are camped on a particular cell may need to re-read SIBs as the stored system information becomes invalid after a certain time (e.g., three hours in LTE and six hours in UMTS). In some cases, a UE may be required to decode a SIB even when the information contained in SIB is not useful to the UE. For example, a stationary UE supporting a particular radio access technology (RAT) may be forced to read SIBs that contain information regarding a RAT not supported by the stationary UE.

As such, improvements in decoding of SIBs in a wireless communications system are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method includes managing decoding of SIBs at a user equipment (UE) in a wireless communications system. The described aspect may include detecting, by a UE, a trigger event for decoding one or more system information blocks (SIBs) received from a first cell, determining to avoid decoding of at least one SIB of the one or more SIBs received from the first cell in response to the detected trigger event and a mobility pattern of the UE, and using a stored version of the at least one SIB for communication with the first cell.

In an another aspect, an apparatus for managing decoding of SIBs at a UE in a wireless communications system may include a transceiver, a memory, and at least one processor coupled to the memory and configured to detect a trigger event for decoding one or more system information blocks (SIBs) received from a first cell, determine to avoid decoding of at least one SIB of the one or more SIBs received from the first cell in response to the detected trigger event and a mobility pattern of the UE, and use a stored version of the at least one SIB for communication with the first cell.

In another aspect, a computer-readable medium may store computer executable code for managing decoding of SIBs at a UE in a wireless communications system. The described aspects may include code for detecting, by a user equipment (UE), a trigger event for decoding one or more system information blocks (SIBs) received from a first cell, code for determining to avoid decoding of at least one SIB of the one or more SIBs received from the first cell in response to the detected trigger event and a mobility pattern of the UE, and code for using a stored version of the at least one SIB for communication with the first cell.

In another aspect, an apparatus for managing decoding of SIBs at a UE in a wireless communications system may include means for detecting, by a user equipment (UE), a trigger event for decoding one or more system information blocks (SIBs) received from a first cell, means for determining to avoid decoding of at least one SIB of the one or more SIBs received from the first cell in response to the detected trigger event and a mobility pattern of the UE, and means for using a stored version of the at least one SIB for communication with the first cell.

In another aspect, a method, an apparatus, and a computer readable medium may include managing transmission of SIBs at a base station in a wireless communications system. The described aspect may include determining, by a base station, a mobility pattern of a user equipment (UE) or one or more features supported by the UE of one or more UEs, generating validity durations for one or more system information blocks (SIBs) based at least on the mobility pattern of the UE or the one or more features supported by the UE, generating the one or more SIBs using the generated validity durations in reserved fields of the one or more SIBs, and broadcasting the one or more SIBs to the UE.

In another aspect, an apparatus for conditional utilization of reference signals for managing communications of one or more UE in a wireless communications system may include means for receiving a transmission having a first subframe slot and a second subframe slot, wherein at least one of the first subframe slot and the second subframe slot have a single-slot TTI. The described aspects further include means for detecting a first DM-RS in the first subframe slot and a second DM-RS in the second subframe slot. The described aspects further include means for determining, via a processor, whether at least one condition exists for using the second DM-RS in the second subframe slot for demodulating the at least one downlink channel in the first subframe slot. The described aspects further include means for determining whether to demodulate the at least one downlink channel in the first subframe slot using the first DM-RS in the first subframe slot or to demodulate both the first DM-RS in the first subframe slot and the second DM-RS in the second subframe slot based on whether the at least one condition exists.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
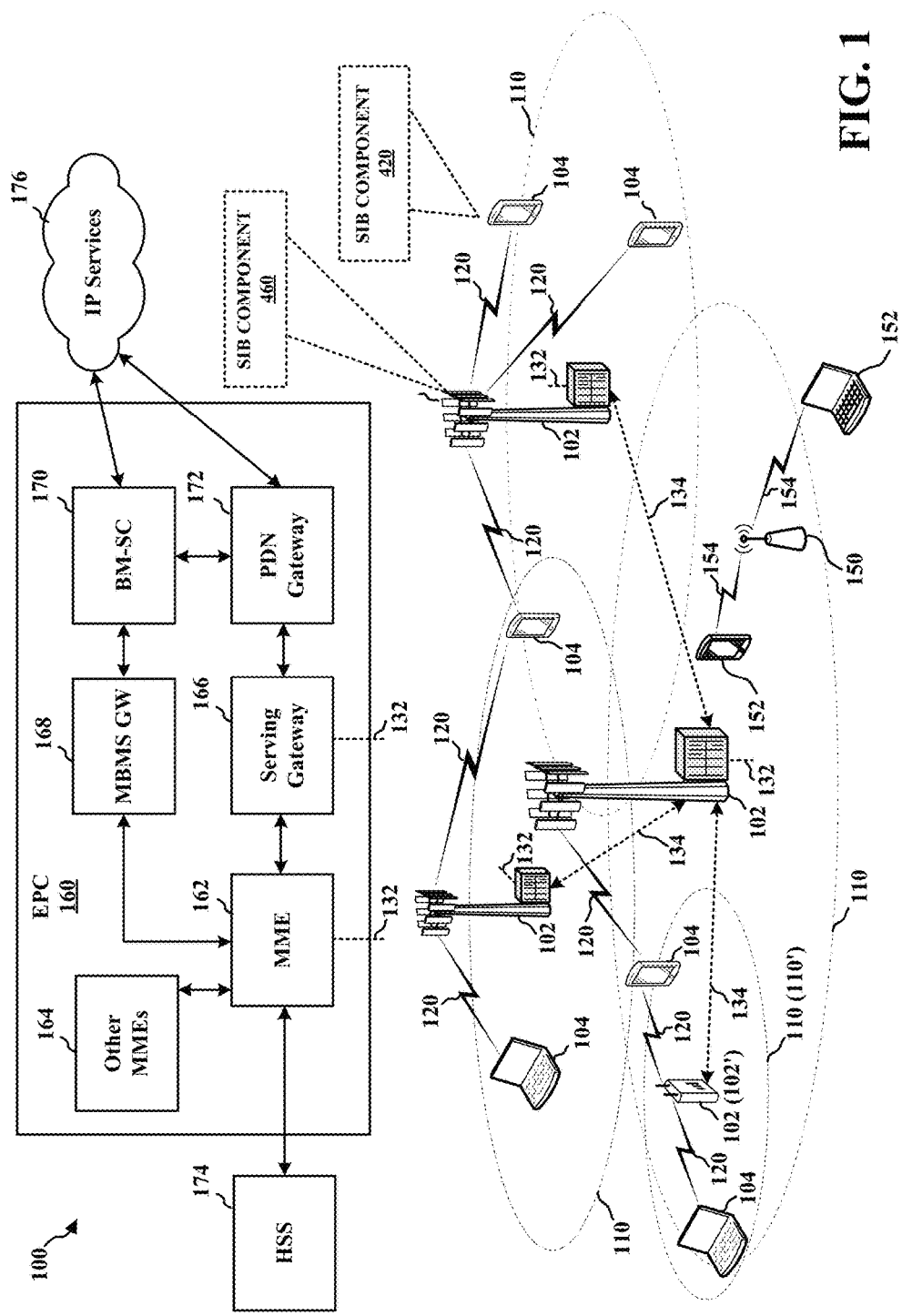
FIG. 1 is a diagram illustrating an example of a wireless communications system and an access network including a UE having an aspect of a SIB component for managing decoding of SIBs and a cell having an aspect of a SIB component for managing SIB transmissions as described herein in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present disclosure relates to managing SIB transmissions at a base station and/or managing decoding of SIBs at a UE. The base station may determine a mobility pattern of a UE and/or the features supported by the UE and generate validity durations for one or more SIBs based on the mobility pattern of the UE or the features supported by the UE. The base station generates one or more SIBs using the generated validity durations in reserved fields of the one or more SIBs and broadcasts the one or more SIB to a UE. The UE detects a trigger event for decoding one or more SIBs received from the base station and determines to avoid decoding of at least one SIB of the one or more SIBs received from the base station in response to the detected trigger event and the mobility pattern of the UE. The UE uses a stored version of the at least one SIB for communication with the base station. The above defined mechanism achieves savings in terms of power and processing resources at the UE and thereby improve performance of the wireless network.

FIG. 1 is a diagram illustrating an example of a wireless communications system and an access network 100 including at least one UE 104 configured to include a SIB component 420 for managing decoding of SIBs at UE 104 and/or at least one base station 102 configured to include a SIB component 460 for managing SIB transmissions at base station 104 in accordance with various aspects of the present disclosure. The wireless communications system 100 (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells can include one or more of femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps with the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is a control node that processes the signaling between the UEs 102 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station 102 may also be referred to as a Node B, evolved node B (eNB), an access point, a base transceiver station, a radio base station, a radio transceiver, a transceiver function, a basic service set (BSS), an extended service set (ESS), or some other suitable terminology. The eNB 102 provides an access point to the EPC 110 for a UE 102. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 102 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a DL frame structure in LTE, which may be a frame structure that may be received by at least one UE 104 configured to include SIB component 420 for managing decoding of SIBs at the UE 104 in accordance with various aspects of the present disclosure. FIG. 2B is a diagram 230 illustrating an example of channels within the DL frame structure in LTE that may be used by the UE 104 as described herein. FIG. 2C is a diagram 250 illustrating an example of an UL frame structure in LTE that may be used by the UE 104. FIG. 2D is a diagram 280 illustrating an example of channels within the UL frame structure in LTE that may be used by the UE 104. Other wireless communication technologies may have a different frame structure and/or different channels. In LTE, a frame (10 ms) may be divided into 10 equally sized subframes. Each subframe may include two consecutive time slots. A resource grid may be used to represent the two time slots, with each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), with each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB indicates a number of RBs in the DL system bandwidth, a PHICH configuration, and a system frame number (SFN). The physical downlink shared channel (PDSCH) carries user data, broadcast system information not transmitted through the PBCH, such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
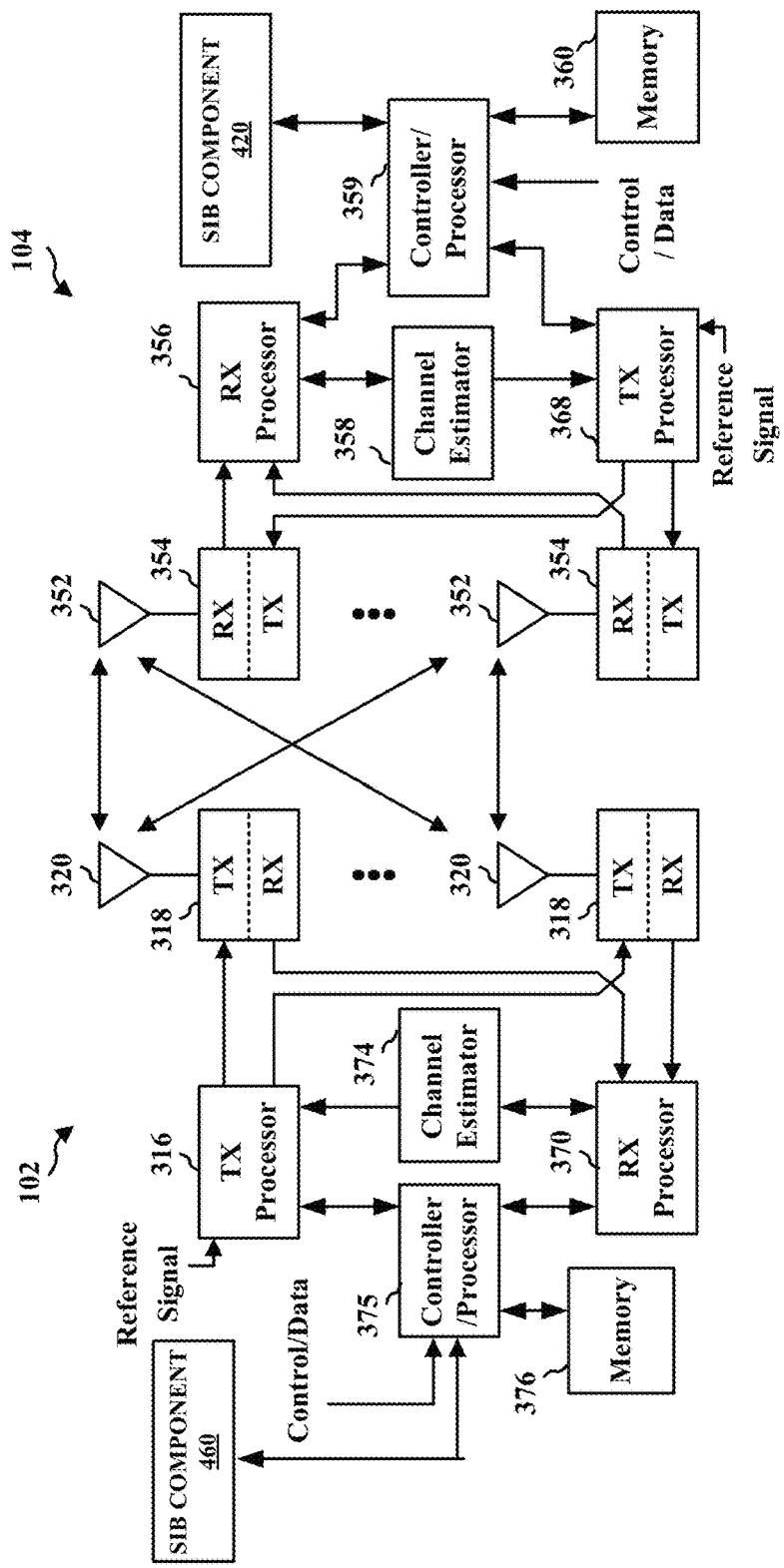
FIG. 3 is a diagram illustrating an example of an evolved Node B (eNB) (or a base station, a cell, etc.) and UE in an access network, where the base station and the UE include an aspect of a SIB component as described in accordance with various aspects of the present disclosure.

FIG. 3 is a block diagram of a base station 102 in communication with a UE 104 in an access network. In an aspect, the UE 104 may be configured to include a SIB component 420 to manage decoding of SIBs at the UE 104 and/or the base station 102 configured to include a SIB component 460 for managing SIB transmissions at the base station 104, which are described in more detail below with respect to FIG. 4. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 104. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102 the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4:
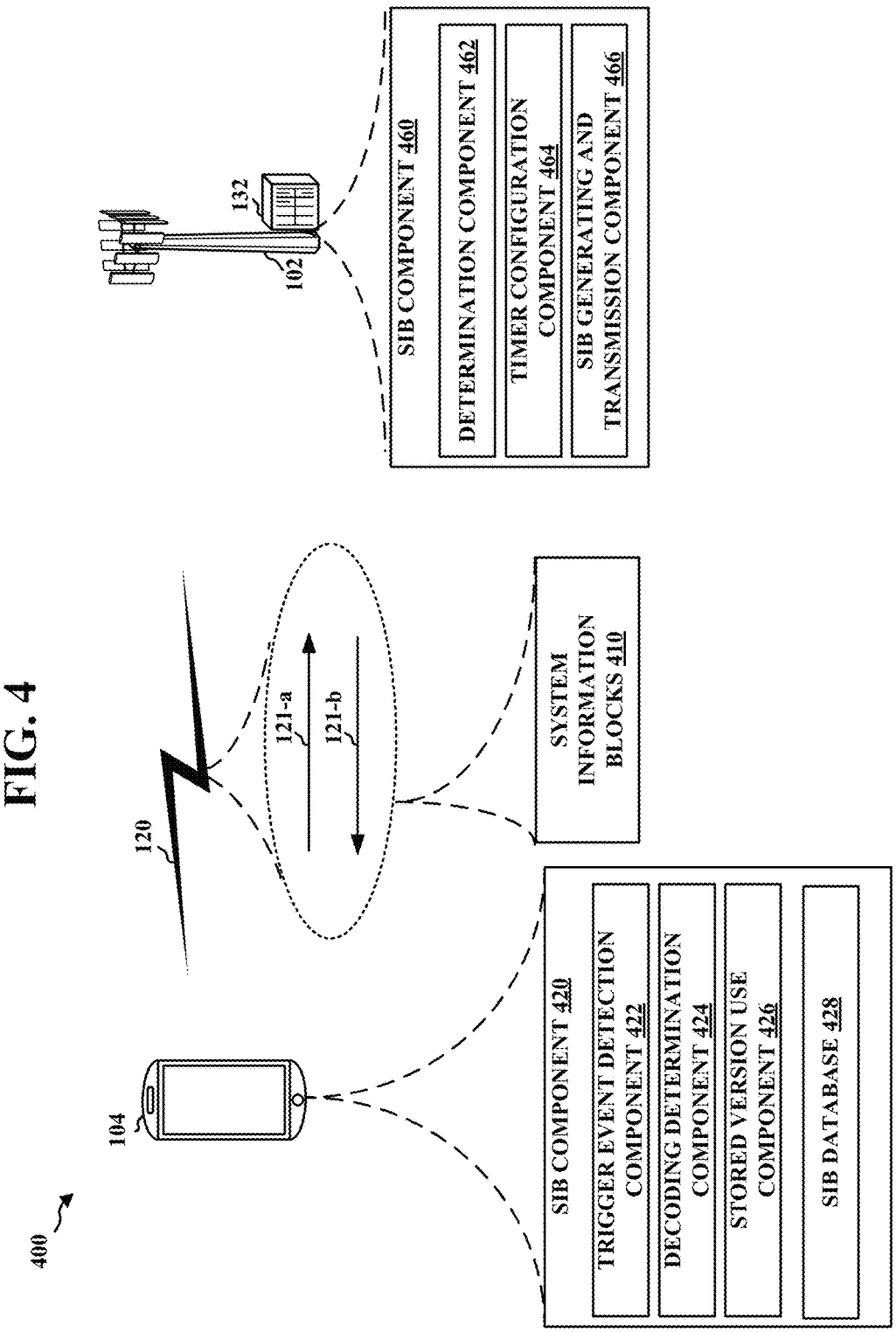
FIG. 4 is a schematic diagram of a wireless communications system including a UE and a base station having an aspect of a SIB component in accordance with various aspects of the present disclosure.

Referring to FIG. 4, in an aspect, a wireless communications system 400 (which may be the same as or similar to wireless communications system and an access network 100 of FIG. 1) includes at least one UE 104 in a communication coverage of at least one base station 102. The base station 102 (collectively referred to as Evolved Universal Mobile Telecommunications System (UMTS) Terrestrial Radio Access Network (E-UTRAN)) may interface with an EPC (such as EPC 160 of FIG. 1) through backhaul links 132

(e.g., S1 interface). In an aspect, the UE 104 may include one or more processors (not shown) and, optionally, memory (not shown), that may operate in combination with a SIB component 420 to manage decoding of SIBs received from the base station 104 and/or the SIB component 460 during wireless communications. The wireless communications between the UE 104 and the base station 102 may include signals transmitted by either the base station 102 or the UE 104 via a communication link 120. For example, wireless communications may include one or more downlink channels 121-*b* transmitted by the base station 102 to the UE 104, and one or more uplink channels 121-*a* transmitted by the UE 104 to the base station 102, and may include transmission of one or more SIBs 410 from the base station 102 to the UE 104.

In an aspect, the base station 102 may transmit (e.g., broadcast) one or more SIB types, e.g., SIBtypeX, SIBtypeY, SIBtypeZ, etc. on the downlink 121-*b* to one or more UEs, e.g., UE 104, present in the coverage area of the base station 102. For example, SIBtypes X, Y, and/or Z may be a type of SIB, e.g., SIBtype 1-13 supported by 3GPP Specifications. In one implementation, SIBs broadcasted from the base station 102 may have different validity durations (e.g., valid for different time durations) based at least on the type of UE. For example, the UE 104 may be a stationary UE, a semi-stationary UE, or a mobile UE, as described below in detail. In another implementation, SIBs broadcasted from the base station 102 may have different validity durations based at least on the type of SIB. That is, for example, SIBtypeX may have a different validity duration from SIBtypeY, for example, based on how frequently the SIBs change. A validity duration for a SIB may be defined as duration of time for which a SIB is valid at the UE once the SIB is received at the UE 104 or when the SIB was broadcasted from the base station 102.

For example, a device may be defined as stationary, semi-stationary, or mobile device based at least on the mobility characteristics of the device. A device may be considered as stationary if the device camps on a base station and remains camped (mostly) on the same base station, e.g., a utility meter. A device may be defined as a semi-stationary when the device camps on a list of base stations frequently, for example, a UE moving from point A to point B and back to point B while transitioning through various base stations, for example, base stations 510, 520, 530, and 540 as described in detail below in reference to FIG. 5). A device which is not considered as stationary or semi-stationary device and/or which moves across the wireless network 100 or 400 may be defined as mobile. Additionally, a device may be defined as voice only (e.g., supports voice calls only), data only (e.g., supports data calls only), broadcast services support, etc. based on the features and/or functionality supported by the device. The details regarding the type of device and/or features supported by the device may be broadcasted by the base station 102 and/or detected by the UE 104 at the UE 104 based on the 3GPP Release of the UE 104. Further, the base station 102 may determine the type of the device and/or the features supported by the UE 104 when the UE 104 registers with the base station 102.

In an additional example, the base station 102 may transmit SIBs with different validity durations based at least on a type of SIB (e.g., SIBtypeX, SIBtypeY, etc.). For example, the base station 102 may transmit SIBtypeX with a validity duration of 24 hours and/or SIBtypeY with a validity duration of 12 hours. The base station 102 may configure the validity durations of the SIBs based at least on how frequently the SIBs are updated by the base station 102.

For instance, information broadcasted in SIBtype1 may include cell access related parameters which may not change frequently. In such a scenario, the base station 102 may transmit a SIB that changes less frequently with a longer validity durations and/or SIBs that change more frequently with shorter validity durations. This mechanism improves the performance of the wireless communications system 400, e.g., UE 104, as the UE has to decode the SIBs less frequently (and ensuring at the same time the UEs have the most recent SIBs that are transmitted from base station).

In an aspect, the UE 104 and/or the SIB 420 may include a trigger event detection component 422 which may be configured to detect a trigger event for decoding one or more SIBs received from a cell, a decoding determination component 424 which may be configured to determine to avoid decoding of at least one SIB of the one or more SIBs received from the cell in response to the detected trigger event and a mobility pattern of the UE, and/or a stored version use component 426 which may be configured to use a stored version (e.g., in a SIB database 428) of the at least one SIB for communication with the cell.

In an additional aspect, the base station 102 and/or the SIB component 460 may include a determination component 462 which may be configured to determine a mobility pattern of a UE or one or more features supported by the UE of one or more UEs, a timer configuration component 464 which may be configured to generate validity durations for one or more SIBs based at least on the mobility patterns of the UE or the one or more features supported by the UE, and/or a SIB generating and transmission component 426 which may be configured to generate the one or more SIBs with the generated validity durations using reserved fields of the one or more SIBs and broadcasting the one or more SIBs to the UE.

Figure 5:
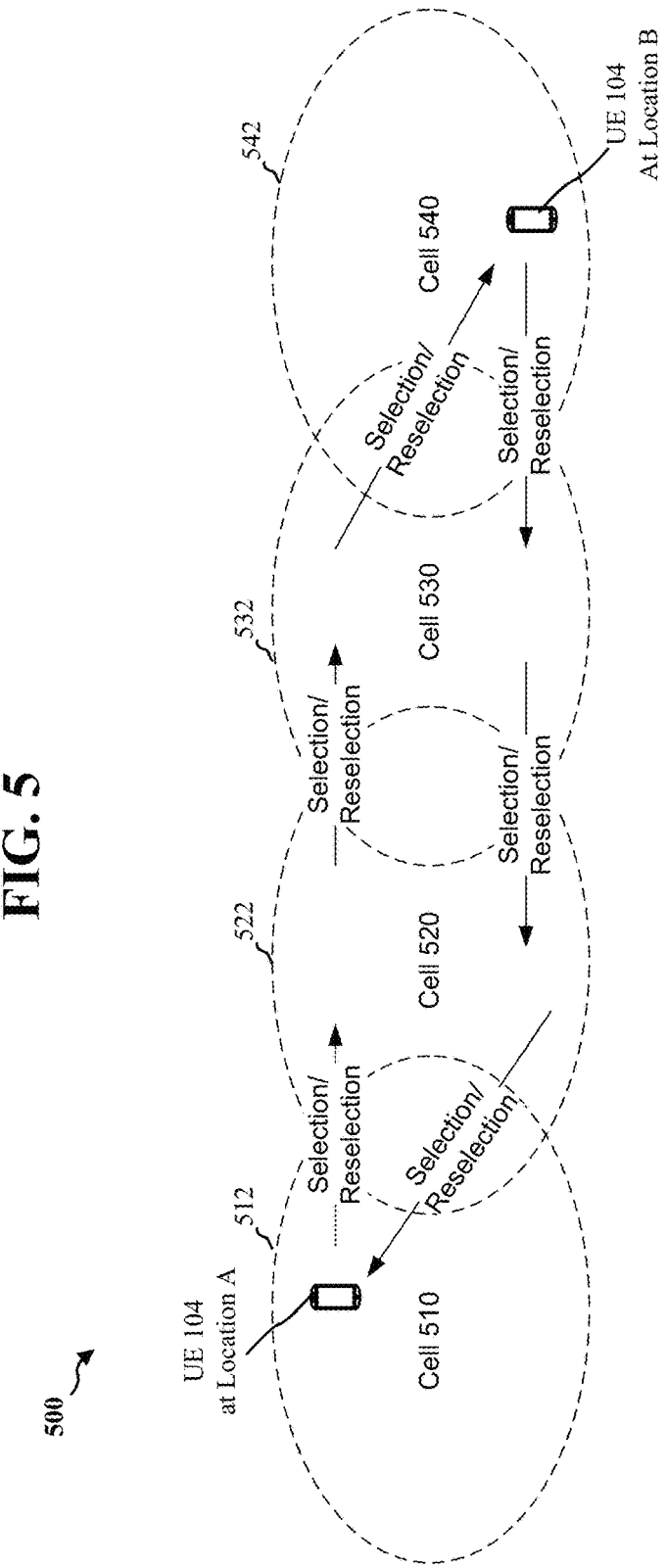
FIG. 5 illustrates an example aspect of managing decoding of SIBs at a UE in accordance with various aspects of the present disclosure.

FIG. 5 illustrates an example aspect of managing decoding of SIBs 500 at a UE in accordance with various aspects of the present disclosure.

For example, the UE 104 at location A may be in a coverage area 512 of cell 510. For instance, in an example aspect, the location A may be associated with a residence location of a user associated with the UE 104. The UE 104 may move out of coverage area 512 towards coverage area 522 of cell 520 and may perform either a selection or a selection from cell 510 to cell 520 depending on whether the UE 104 is an idle or a connected mode. The UE 104 may continue to move towards coverage area 532 of cell 530 by performing a cell selection or reselection to cell 530, and end up at location B in a coverage area 542 of cell 540 after performing a cell selection or a reselection to cell 540. For instance, in an example aspect, the location B may be associated with an office location of the user associated with the UE 104. Although cell selection and cell reselection are mentioned here, the UE 104 may move from one cell to another cell via other means, for example, handover, power-off/power-on, etc. Cells 510, 520, 530, and/or 540 may be similar to the base station 102.

The UE 104 passes through coverage areas of cells 520, 530, and 540 as the UE 104 moves from location A to location B. For example, when UE 104 moves from cell 510 to cell 520, the UE 104 may perform a cell selection or a cell reselection which may require decoding of a master information block (MIB) and one or more system information blocks (SIBs) broadcasted from cell 520. The UE 104 may decode (or read) the MIB broadcasted from cell 520 and/or one or more SIBs broadcasted from cell 520 and store (or save) the decoded SIB information (e.g., information relayed in the SIB) in a SIB database 428 located at the UE 104. In an aspect, the UE 104 may store/save the decoded SIB information in the SIB database 428 with validity durations higher than that are currently defined in the 3GPP Specification. For instance, the current 3GPP Specifications (e.g., 3GPP 36.331) define a validity duration of three hours in LTE networks and six hours for UMTS networks. However, the UE 104 and/or the SIB component 420 may configure higher validity durations for the SIBs based on the mobility pattern of a UE. In an additional aspect, a UE may consider the stored SIB information invalid (e.g., not valid any more) once the validity duration is over. That is, if the validity duration of a SIB it set to 12 hours, the SIB may be considered invalid after 12 hours. In such a scenario, the UE 104 may decode the SIBs again (e.g., re-read) and store the SIB information in the SIB database 428.

When the UE 104 reaches point B in the coverage area 542 of cell 540, the UE 104 may remain camped on cell 540 for some time, for example, 8-10 hours, and afterwards may start moving towards coverage area 532 of cell 530. For instance, in an example aspect, the user of the UE 104 may be at work at location B and may be returning home after a work-day. In such a scenario, the UE 104 may perform a cell selection or a cell reselection to cell 530. This may require the UE 104 decoding the MIB and/or one or more SIBs broadcasted from cell 530 again. However, prior to decoding of the MIB and one or more SIBs broadcasted from cell 530, the UE 104 may determine if the SIB information associated with one or more SIBs of cell 530 stored in the SIB database 428 at the UE is still valid (e.g., not expired). In one implementation, the UE 104 may determine the validity of the stored SIB information by comparing a value tag of the MIB broadcasted from cell 530 with the value tags of the SIBs stored in the SIB database 428. If the value tags match, the UE 104 may skip decoding of the SIB and use the information from the SIB database 428 (e.g., corresponding to the specific SIB). That is, the UE 104 may use a stored version of the of the SIB, for example, for performing a cell selection or a cell reselection to cell 530. However, if the validity of the one or more SIBs expired (e.g., validity duration passed, value tags do not match, etc.), the one or more SIBs are not considered valid, and stored version of the one or more SIBs may contain outdated information.

In an aspect, the UE 104 may autonomously configure the duration of validity timers for the one or more SIBs based at least on the type of UE and/or mobility pattern of the UE. That is, the UE 104 may autonomously configure the duration of the validity timers of the one or more SIBs based on whether the UE 104 is stationary, semi-stationary, or mobile. In one example aspect, the UE 104 may consider the UE 104 as semi-stationary and configure the validity duration to 12 hours. In an additional aspect, the UE 104 may configure the validity duration based at least on higher validity duration transmitted by base stations. For instance, the base station 104 may broadcast a SIB to a UE with a validity duration of 8 hours, and the UE may adjust the validity duration for the SIB to 12 hours based on UE type, SIB type, and any other information locally available at the UE. Similarly, the UE 104 may skip decoding of SIBs in cell 520 and 510 and may reach point A in coverage area 512 of cell 510.

The skipping (or avoiding) of frequent decoding of SIBs by the UE 104 improves performance of the UE 104 as the UE 104 does not have to decode the SIBs frequently and instead may read (e.g., retrieve) the relevant SIB information from the SIB database 428.

Figure 6:
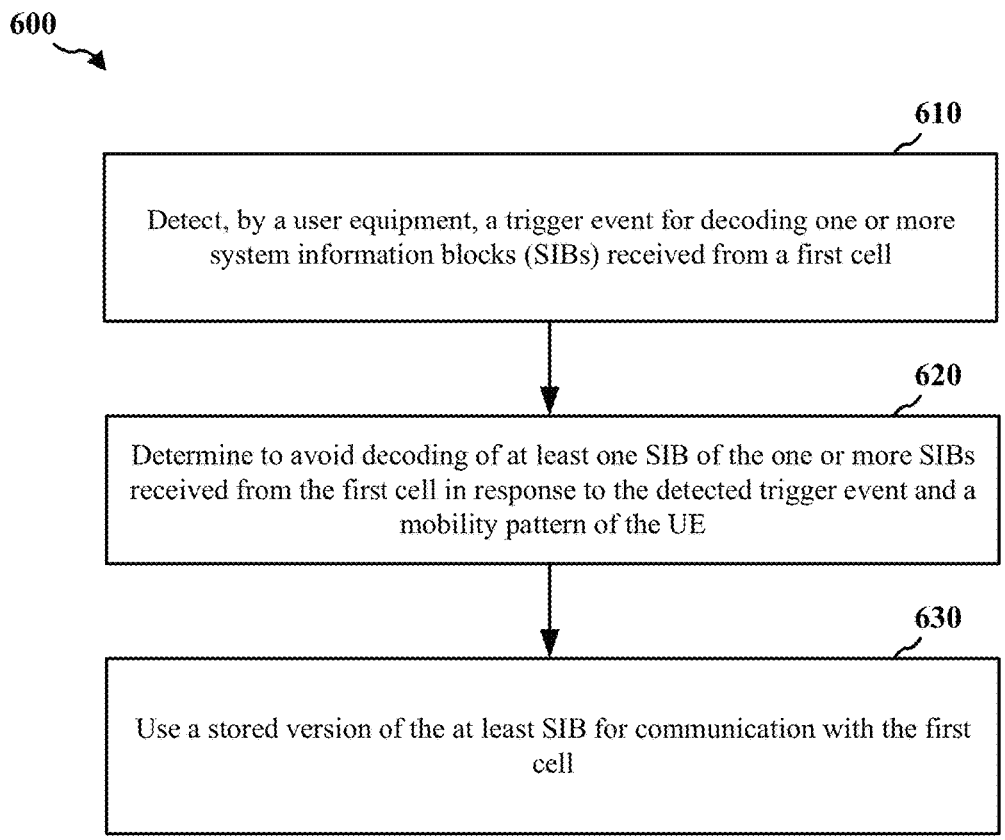
FIG. 6 is a flow diagram of an aspect of managing decoding of SIBs, which may be executed by SIB component of FIG. 4, in accordance with various aspects of the present disclosure.

Referring to FIG. 6, a UE such as UE 104 (FIGS. 1 and 4) may include one or more processors to perform an aspect of a method 600 for managing decoding of SIBs during wireless communications. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

At block 610, method 600 includes detecting, by a user equipment (UE), a trigger event for decoding one or more system information blocks (SIBs) received from a first cell. For example, in an aspect, the UE 104 and/or the SIB component 420 may include a trigger event detection component 422, such as a specially programmed processor module, or a processor executing specially programmed code stored in a memory to detect a trigger event for decoding one or more SIBs received from a first cell, e.g., cell 530 (FIG. 5) when performing a cell selection or cell reselection from cell 540 to cell 530. The trigger event, for example, may be a UE cell selection, a cell reselection, a power-on, a handover completion, or a return from out of coverage, etc. as these events required decoding of a MIB and/or one or more SIBs at the UE. For instance, the trigger event may be a cell selection (e.g., the UE 104 in an IDLE RRC state) or a cell reselection (e.g., UE 104 in a CONNECTED RRC state) to cell 530 when the cell is camped on cell 540.

At block 620, method 600 includes determining to avoid decoding of at least one SIB of the one or more SIBs received from the first cell in response to the detected trigger event and a mobility pattern of the UE. For example, in an aspect, the UE 104 and/or the SIB decoding component 420 may include a decoding determination component 424, such as a specially programmed processor module, or a processor executing specially programmed code stored in a memory to determine to avoid decoding of at least one SIB, e.g., SIB type "X" received from the first cell, e.g., cell 530, in response to the detected trigger event and a mobility pattern of the UE 104. As described above, the trigger event that is detected may be a cell selection or a cell reselection event (e.g., described above in reference to block 610 of FIG. 6), and the mobility pattern of the UE 104 may be based on whether the UE 104 is stationary, semi-stationary, or mobile.

At block 630, method 600 includes using a stored version of the at least one SIB for communication with the first cell. For example, in an aspect, the UE 104 and/or the SIB decoding component 420 may include a stored version use component 426, such as a specially programmed processor module, or a processor executing specially programmed code stored in a memory to use a stored version of the at least one SIB for communication with the first cell, cell 530. The stored version of the at least one SIB may be saved in the SIB database 428 at the UE 104 which could be retrieved by the UE 104.

In one implementation, when the mobility pattern of the UE 104 is defined (e.g., identified, detected, determined, etc.) as stationary, for example, the UE 104 is associated with a utility meter, the UE 104 and/or the SIB decoding component 420 may set or configure a duration of a validity timer of a SIB, e.g., SIB X to a longer duration, e.g., 48 hours, as a stationary UE generally does not move to a different cell unless, for example, the coverage on the current camped cell is lost. In another implementation, when the mobility pattern of the UE 104 is defined (e.g., identified, detected, determined, etc.) as semi-stationary, e.g., the UE 104 moving from point A to point B and later from point B to point A as described in reference to FIG. 5, the UE 104 and/or the SIB decoding component 420 may configure the value of the validity timer to a value higher than the currently configured value of 12 hours for LTE UEs. In a further implementation, mobility pattern of the UE 104 is defined (e.g., identified, detected, determined, etc.) as mobile, e.g., the UE 104 mobile all over the wireless network 100, the UE 104 and/or the SIB decoding component 420 may configure the value of the validity timer to a value higher than the currently configured value of 3 hours for LTE UEs. For example, the UE 104 and/or the SIB decoding component 420 may configure the value of the validity timer to a value which is higher than three hours without compromising the performance of the wireless network, for example, four hours.

In another implementation, the duration of validity timers may be configured based at least on the type of SIB. For instance, the UE 104 and/or the SIB decoding component 420 may define the duration of the validity of SIB X to 12 hours. In an aspect, SIBtypeX may be a type of SIB that includes information which does not change frequently. For example SIBtype X may be SIBtype1 which may include cell access related parameters (e.g., Cell ID, PLMN ID, etc.) that may not change frequently.

In one aspect of method 600, the UE 104 and/or the SIB component 420 may detect that the duration of the validity timer of the stored version of the at least one SIB has expired. However, the UE 104 and/or the SIB component 420 may determine that a number of paging messages received by the UE 104, which has a mobility pattern of stationary, satisfies a threshold, and ignores the validity timer and stays with a current cell. That is, the UE 104 may not move to a different cell and remain on the current cell if the UE 104 determines that the stored version of the SIB is still valid based on whether the UE 104 is still receiving paging messages reliably (e.g., by comparing to a threshold).

In another aspect of method 600, the UE 104 and/or the SIB component 420 may identify one or more features that are not supported by the UE 104, and avoid (or skip) decoding of one or more SIBs that includes information related to the one or more identified features. This saves power and/or processing resources at the UE 104 and improves performance.

Figure 7:
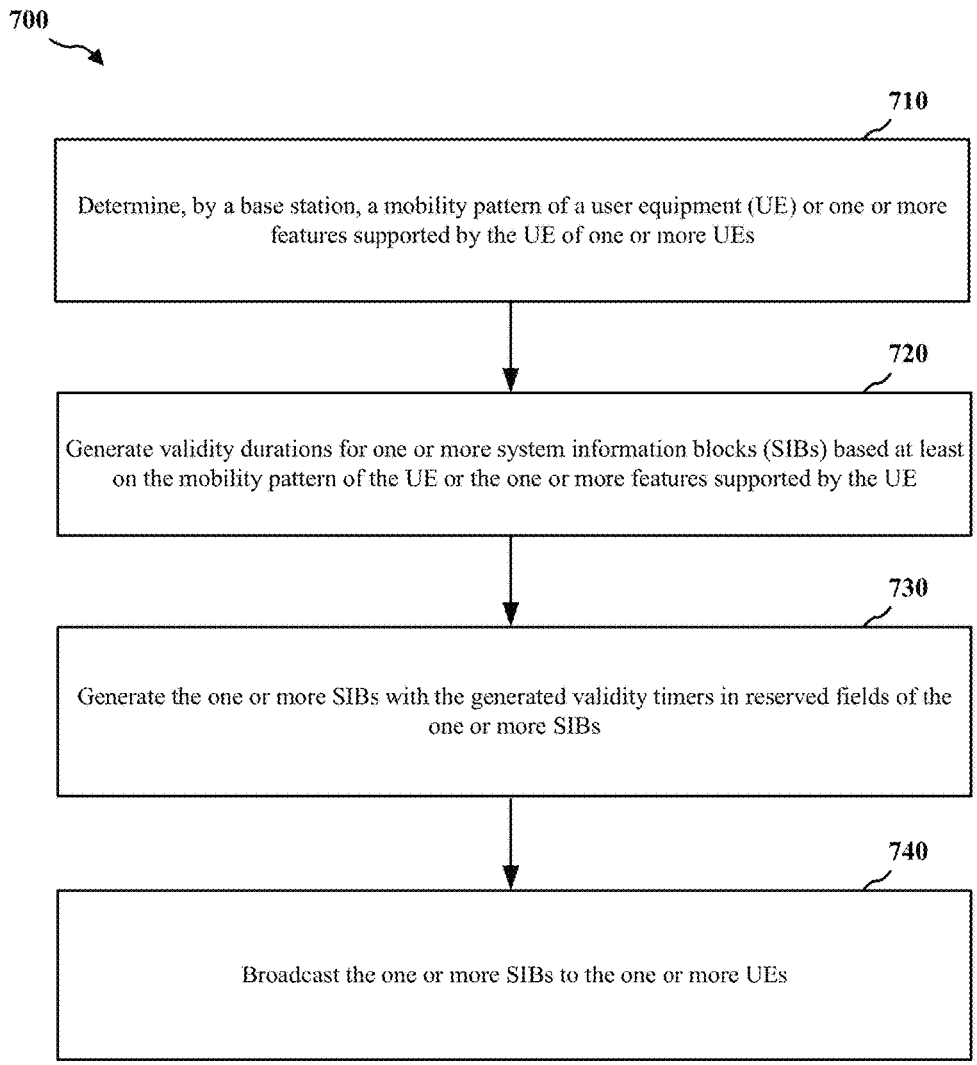
FIG. 7 is a flow diagram of an aspect of managing SIB transmissions, which may be executed by the SIB component of FIG. 4, in accordance with various aspects of the present disclosure.

Referring to FIG. 7, a base station such as base station 102 (FIGS. 1 and 4) may include one or more processors to perform an aspect of a method 700 for managing SIB transmissions during wireless communications. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

At block 710, method 700 includes determining, by a base station, a mobility pattern of a user equipment (UE) or one or more features supported by the UE of one or more UEs. For example, in an aspect, the base station 102 and/or the SIB component 460 may include a determination component 462, such as a specially programmed processor module, or a processor executing specially programmed code stored in a memory to determine a mobility pattern of a UE or one or more features supported by the UE of one or more UEs. As described in reference to FIGS. 4-5, the base station 102 may determine the mobility pattern of a UE 104 based on the 3GPP Release of the UE 104 (e.g., Release 12, etc.) and/or the operational measurements (OMs) or other information received from the UE 104 when the UE 104 register with the base station 102.

At block 720, method 700 includes generating validity durations for one or more system information blocks (SIBs) based at least on the mobility pattern of the UE or the one or more features supported by the UE. For example, in an aspect, the base station 102 and/or the SIB component 460 may include a time configuration component 464, such as a specially programmed processor module, or a processor executing specially programmed code stored in a memory to generate (or configure) validity durations for one or more SIBs based at least on the mobility pattern of the UE 104 or the one or more features supported by the UE 104.

At block 730, method 700 includes generating the one or more SIBs using the generated validity durations in reserved fields of the one or more SIBs. For example, in an aspect, the base station 102 and/or the SIB component 460 may include a SIB generating and transmission component 466, such as a specially programmed processor module, or a processor executing specially programmed code stored in a memory to generate the one or more SIBs using the generated validity durations. The validity durations may be included in reserved fields of the one or more SIBs for transmission/broadcasting to the UEs.

At block 740, method 700 includes broadcasting the one or more SIBs to the one or more UEs. For example, in an aspect, the base station 102 and/or the SIB component 460 may include the SIB generating and transmission component 466, such as a specially programmed processor module, or a processor executing specially programmed code stored in a memory to broadcast the one or more SIBs to the one or more UEs. The generation and/or transmission of SIBs with validity durations based at least on the mobility pattern of the UE and/or the features supported by the UE will allow the UE to manage the decoding of the SIB transmissions from the base station in such a way to save power and/or processing resource at the UE.

In an additional aspect, the base station 102 and/or the SIB component 460 cell may determine maturity (e.g., for how long the cell has been deployed) of the network prior to generating validity durations for the SIBs. The base station 102 and/or the SIB component 460 may determine the time since the cell has been deployed based on, for example, a time duration since the configuration of a physical cell ID (PCI) of the base station. The base station 102 may compare the time since the PCI of the base station was configured with a threshold and may generate validity durations with higher values if the time since the PCI of the base station was configured with the PCI is equal to or above the threshold and with lower values if the time since the PCI of the base station was configured with the PCI is below the threshold.

Figure 8:
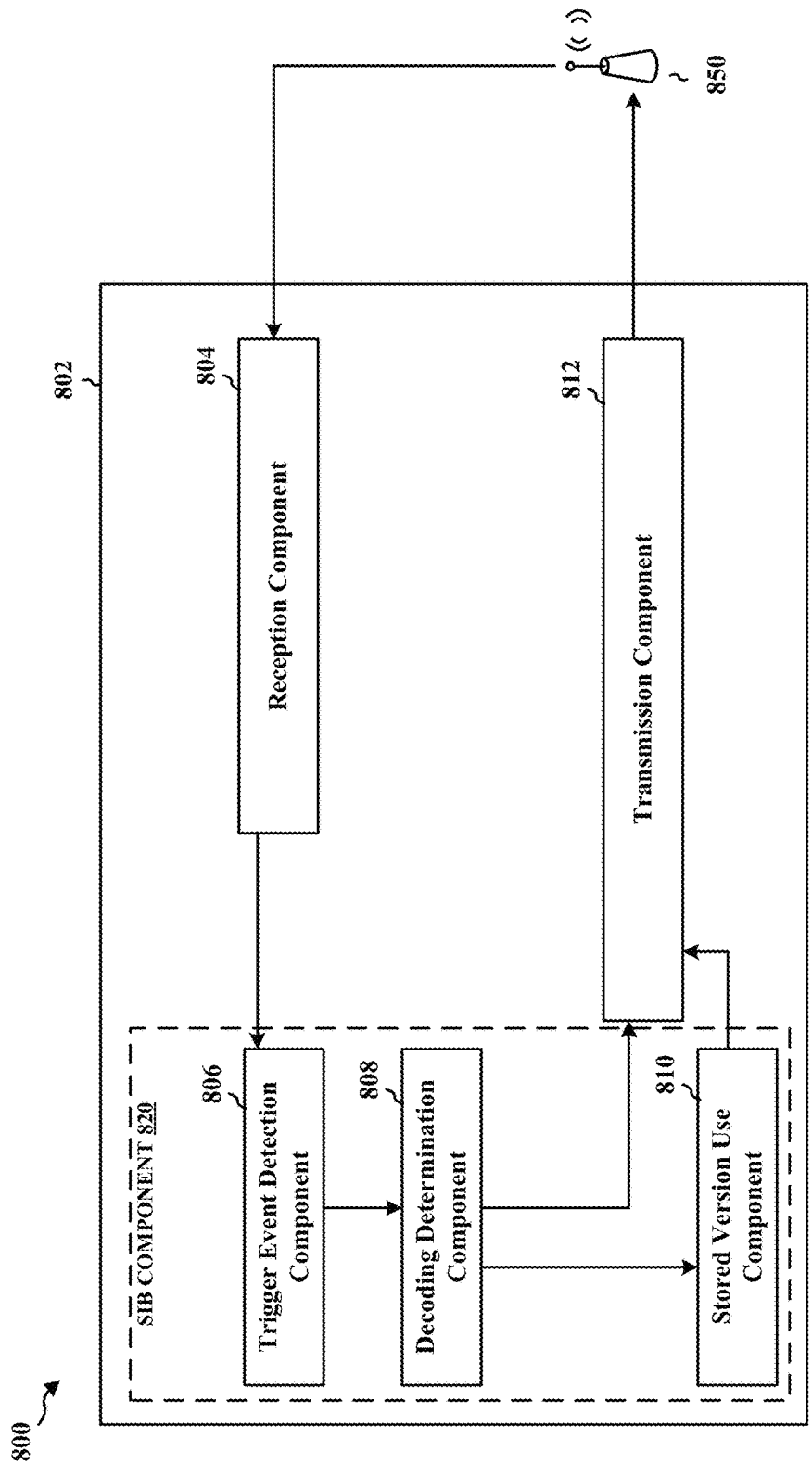
FIG. 8 is a conceptual data flow diagram illustrating the data flow between different means/components in an exemplary apparatus including a SIB component for managing decoding of SIBs in accordance with various aspects of the present disclosure.

FIG. 8 is a conceptual data flow diagram 800 illustrating the data flow between different means/components in an exemplary apparatus 802 that includes a SIB component 820, which may be the same as or similar to reference signal utilization component 420 for managing decoding of SIBs. The apparatus may be a UE, which may include UE 104 of FIGS. 1 and 4. The apparatus includes a reception component 804 that receives a SIB from a base station 102, a trigger even detection component 806 that detects a trigger event for decoding one or more SIBs received from a first cell, a decoding determination component 808 that determines whether to avoid decoding of at least one or more SIBs of the first cell in response to the detected trigger event and a mobility pattern of the UE 104, a stored version use component 810 that uses a stored version of the at least one SIB for communication with the first cell, and/or a transmission component 812 that transmits one or more signals from the apparatus 802 to a network entity 850 (such as a base station or eNodeB).

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
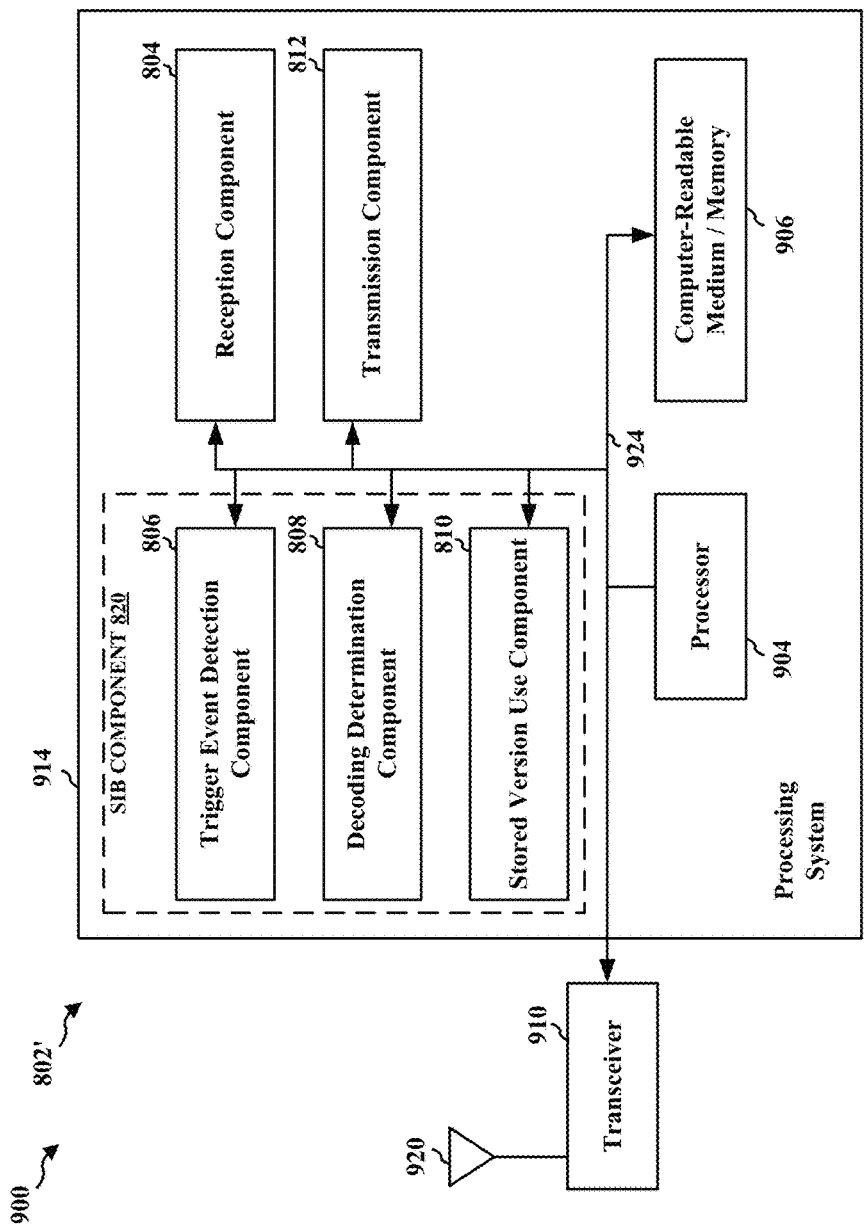
FIG. 9 is a diagram illustrating an example of a hardware implementation for an apparatus employing a processing system including a SIB component for managing decoding of SIBs in accordance with various aspects of the present disclosure.

FIG. 9 is a diagram 900 illustrating an example of a hardware implementation for an apparatus 802' employing a processing system 814 that includes a SIB component 820 (FIG. 8), which may be the same as or similar to the SIB component 420 for managing decoding of SIBs. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, and 812, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 820. The transceiver 910 provides a means for communicating with various other apparatus over a transmission medium. The transceiver 910 receives a signal from the one or more antennas 820, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 804 when executing software. The processing system 914 further includes at least one of the components 804, 806, 808, 810, and 812. The components may be software components running in the processor 904, resident/stored in the computer readable medium/memory 906, one or more hardware components coupled to the processor 804, or some combination thereof.

In one configuration, the apparatus 802/802' for wireless communication includes means for detecting, by a user equipment (UE), a trigger event for decoding one or more system information blocks (SIBs) received from a first cell, means for determining to avoid decoding of at least one SIB of the one or more SIBs of the first cell in response to the detected trigger event and a mobility pattern of the UE, and means for using a stored version of the at least one SIB for communication with the first cell.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and/or the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, comprising:
    detecting, by a user equipment (UE), a trigger event for decoding one or more system information blocks (SIBs) received from a first cell;
    determining to avoid decoding of at least one SIB of the one or more SIBs received from the first cell in response to the detected trigger event and a mobility pattern of the UE;
    using a stored version of the at least one SIB for communication with the first cell, wherein the stored version of the at least one SIB has a duration of a validity timer determined based at least in part on the mobility pattern of the UE;
    detecting, by the UE, that the duration of the validity timer of the stored version of the at least one SIB has expired; and
    determining that a number of paging messages received by the UE satisfies a threshold, and
    wherein, when the mobility pattern of the UE is stationary and when the number of paging messages received by the UE satisfies the threshold, the UE ignores the validity timer and stays with a second cell.

2. The method of claim 1, further comprising:
    setting a duration of the validity timer of the at least one SIB to a value greater than three hours when the mobility pattern of the UE is stationary or semi-stationary and the cell is a long term evolution (LTE) cell.

3. The method of claim 2, wherein setting the validity timer further comprises:
    setting the duration of the validity timer of the at least one SIB based at least in part on a validity duration included in the at least one SIB.

4. The method of claim 3, further comprising:
    performing a cell reselection procedure from a second cell to the first cell using the at least one stored SIB of the first cell when the validity timer has not expired.

5. The method of claim 4, further comprising:
    receiving, by the UE, a master information block (MIB) from the first cell;
    identifying a value tag in the MIB from the first cell; and
    performing the cell reselection procedure from the second cell to the first cell using the stored version of the at least one SIB of the first cell when the value tag in the MIB from the first cell matches a value tag in the stored version of the at least one SIB of the first cell.

6. The method of claim 1, further comprising:
    identifying one or more features that are not supported by the UE, and wherein the UE does not decode one or more SIBs that includes information related to the one or more identified features.

7. The method of claim 1, wherein the trigger event comprises a cell selection, a cell reselection, a powering-on scenario, a handover completion, or a return from out of coverage.

8. An apparatus for wireless communications, comprising:
    a memory; and
    a processor coupled to the memory and configured to:
        detect a trigger event for decoding one or more system information blocks (SIBs) received from a first cell;
        determine to avoid decoding of at least one SIB of the one or more SIBs received from the first cell in response to the detected trigger event and a mobility pattern of the UE; and
        use a stored version of the at least one SIB for communication with the first cell wherein the stored version of the at least one SIB has a duration of a validity timer determined based at least in part on the mobility pattern of the UE;
        detect that the duration of the validity timer of the stored version of the at least one SIB has expired; and
    determine that a number of paging messages received by the UE satisfies a threshold, and
        wherein, when the mobility pattern of the UE is stationary and when the number of paging messages received by the UE satisfies the threshold, the UE ignores the validity timer and stays with a second cell.

9. The apparatus of claim 8, wherein the processor is further configured to:
    set a duration of the validity timer of the at least one SIB to a value greater than three hours when the mobility pattern of the UE is stationary or semi-stationary and the cell is a long term evolution (LTE) cell.

10. The apparatus of claim 9, wherein the processor is further configured to:
    set the duration of the validity timer of the at least one SIB based at least in part on a validity duration included in the at least one SIB.

11. The apparatus of claim 10, wherein the processor is further configured to:
    perform a cell reselection procedure from a second cell to the first cell using the at least one stored SIB of the first cell when the validity timer has not expired.

12. The apparatus of claim 11, wherein the processor is further configured to:
    receive a master information block (MIB) from the first cell;
    identify a value tag in the MIB from the first cell; and
    perform the cell reselection procedure from the second cell to the first cell using the stored version of the at least one SIB of the first cell when the value tag in the MIB from the first cell matches a value tag in the stored version of the at least one SIB of the first cell.

13. The apparatus of claim 8, wherein the processor is further configured to:
    identify one or more features that are not supported by the UE, and
    wherein the UE does not decode one or more SIBs that includes information related to the one or more identified features.

14. The apparatus of claim 8, wherein the trigger event comprises a cell selection, a cell reselection, a powering-on scenario, a handover completion, or a return from out of coverage.

15. An apparatus for wireless communications, comprising:
    means for detecting, by a user equipment (UE), a trigger event for decoding one or more system information blocks (SIBs) received from a first cell;
    means for determining to avoid decoding of at least one SIB of the one or more SIBs received from the first cell in response to the detected trigger event and a mobility pattern of the UE;
    means for using a stored version of the at least one SIB for communication with the first cell, wherein the stored version of the at least one SIB has a duration of a validity timer determined based at least in part on the mobility pattern of the UE;

means for detecting, by the UE, that the duration of the validity timer of the stored version of the at least one SIB has expired; and means for determining that a number of paging messages received by the UE satisfies a threshold, and wherein, when the mobility pattern of the UE is stationary and when the number of paging messages received by the UE satisfies the threshold, the UE ignores the validity timer and stays with a second cell.

16. The apparatus of claim 15, further comprising:

means for setting a duration of the validity timer of the at least one SIB to a value greater than three hours when the mobility pattern of the UE is stationary or semi-stationary and the cell is a long term evolution (LTE) cell.

17. The apparatus of claim 16, wherein setting the validity timer further comprises:

means for setting the duration of the validity timer of the at least one SIB based at least in part on a validity duration included in the at least one SIB.

18. The apparatus of claim 17, further comprising:

means for performing a cell reselection procedure from a second cell to the first cell using the at least one stored SIB of the first cell when the validity timer has not expired.

19. The apparatus of claim 18, further comprising:

means for receiving, by the UE, a master information block (MIB) from the first cell;

means for identifying a value tag in the MIB from the first cell; and means for performing the cell reselection procedure from the second cell to the first cell using the stored version of the at least one SIB of the first cell when the value tag in the MIB from the first cell matches a value tag in the stored version of the at least one SIB of the first cell.

20. The apparatus of claim 15, further comprising:

means for identifying one or more features that are not supported by the UE, and wherein the UE does not decode one or more SIBs that includes information related to the one or more identified features.

21. The apparatus of claim 15, wherein the trigger event comprises a cell selection, a cell reselection, a powering-on scenario, a handover completion, or a return from out of coverage.

* * * * *